US011650661B2

(12) United States Patent
Funatsu

(10) Patent No.: US 11,650,661 B2
(45) Date of Patent: May 16, 2023

(54) ELECTRONIC DEVICE AND CONTROL METHOD FOR ELECTRONIC DEVICE

(71) Applicant: CANON KABUSHIKI KAISHA, Tokyo (JP)

(72) Inventor: Yoshihiro Funatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/953,699

(22) Filed: Nov. 20, 2020

(65) Prior Publication Data

US 2021/0157400 A1 May 27, 2021

(30) Foreign Application Priority Data

Nov. 26, 2019 (JP) .............................. JP2019-213504

(51) Int. Cl.

| G06F 3/01 | (2006.01) |
|---|---|
| G06V 40/16 | (2022.01) |
| G06V 40/19 | (2022.01) |
| H04N 23/63 | (2023.01) |
| H04N 23/611 | (2023.01) |

(52) U.S. Cl.
CPC ............ *G06F 3/013* (2013.01); *G06V 40/165* (2022.01); *G06V 40/171* (2022.01); *G06V 40/19* (2022.01); *H04N 23/611* (2023.01); *H04N 23/633* (2023.01)

(58) Field of Classification Search
USPC ................................ 386/200–234, 239–248
See application file for complete search history.

(56) References Cited

U.S. PATENT DOCUMENTS

| 2003/0071908 | A1* | 4/2003 | Sannoh | H04N 5/23218 348/345 |
|---|---|---|---|---|
| 2009/0285457 | A1* | 11/2009 | Matsuzaka | G06K 9/00248 382/118 |
| 2012/0162603 | A1* | 6/2012 | Dejima | G06F 3/013 351/209 |
| 2015/0138079 | A1* | 5/2015 | Lannsjo | G06F 3/013 345/156 |
| 2015/0177833 | A1* | 6/2015 | Vennstrom | G06T 7/73 345/156 |
| 2017/0060230 | A1* | 3/2017 | Faaborg | G06T 19/006 |
| 2020/0012341 | A1* | 1/2020 | Stellmach | G06F 3/013 |
| 2020/0272231 | A1* | 8/2020 | Klein | G06F 3/04845 |
| 2021/0096641 | A1* | 4/2021 | VanBlon | G06F 3/0238 |

FOREIGN PATENT DOCUMENTS

JP 2018-074200 A 5/2018

* cited by examiner

*Primary Examiner* — Hung Q Dang
(74) *Attorney, Agent, or Firm* — Cowan, Liebowitz & Latman, P.C.

(57) ABSTRACT

An electronic device includes: a gaze detecting unit configured to detect a position of gaze input on an image displayed on a display unit; a subject detecting unit configured to detect from the image a subject of a specific type and a region included in the subject of the specific type; and a control unit configured to execute control so that, in a case where a position selected prior to a user operation on an operating member is not on the subject in the position of gaze input, a region corresponding to the user operation, which is included in the subject in the position of gaze input, is selected in response to the user operation, regardless of the position selected prior to the user operation.

15 Claims, 8 Drawing Sheets

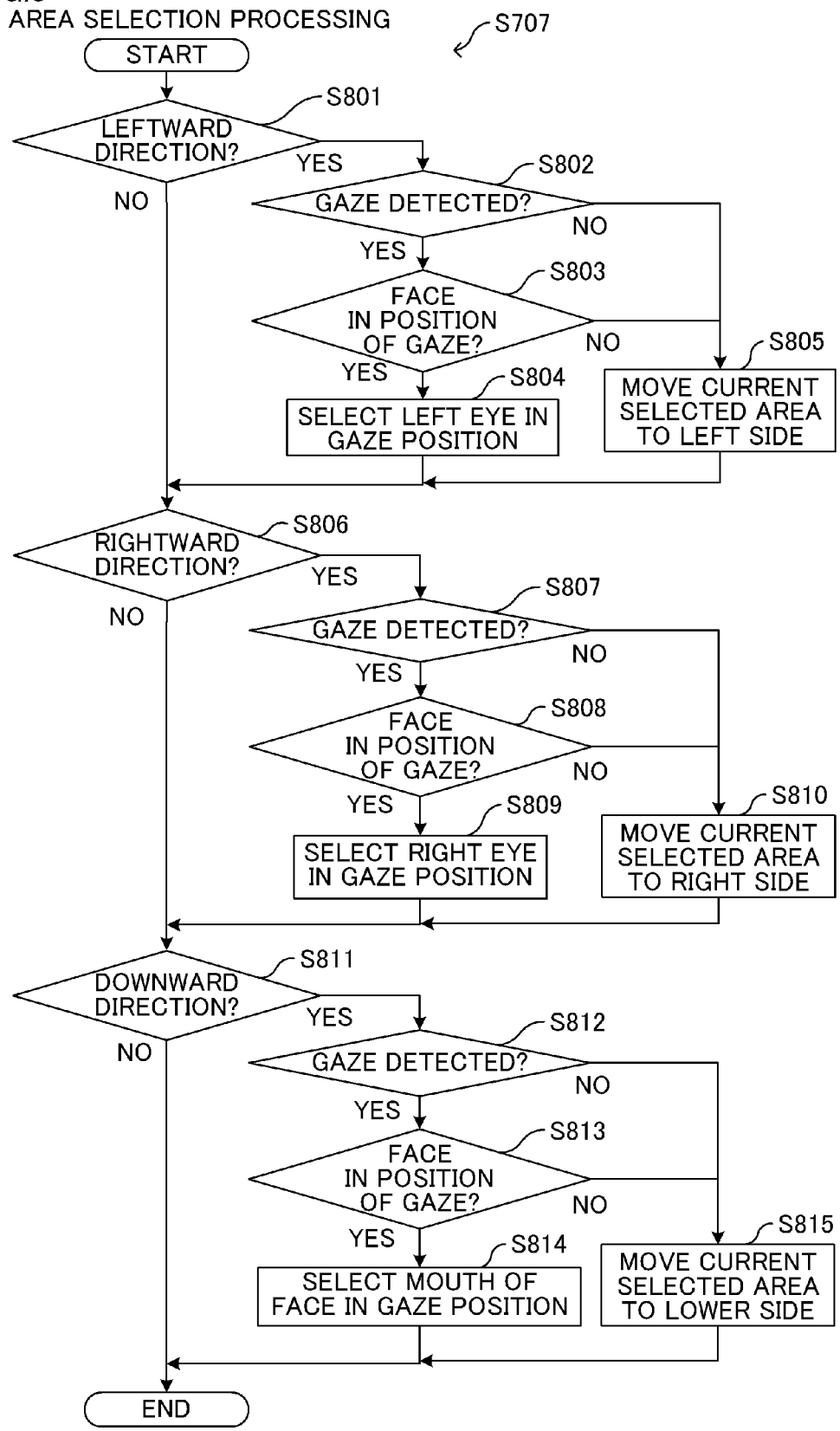

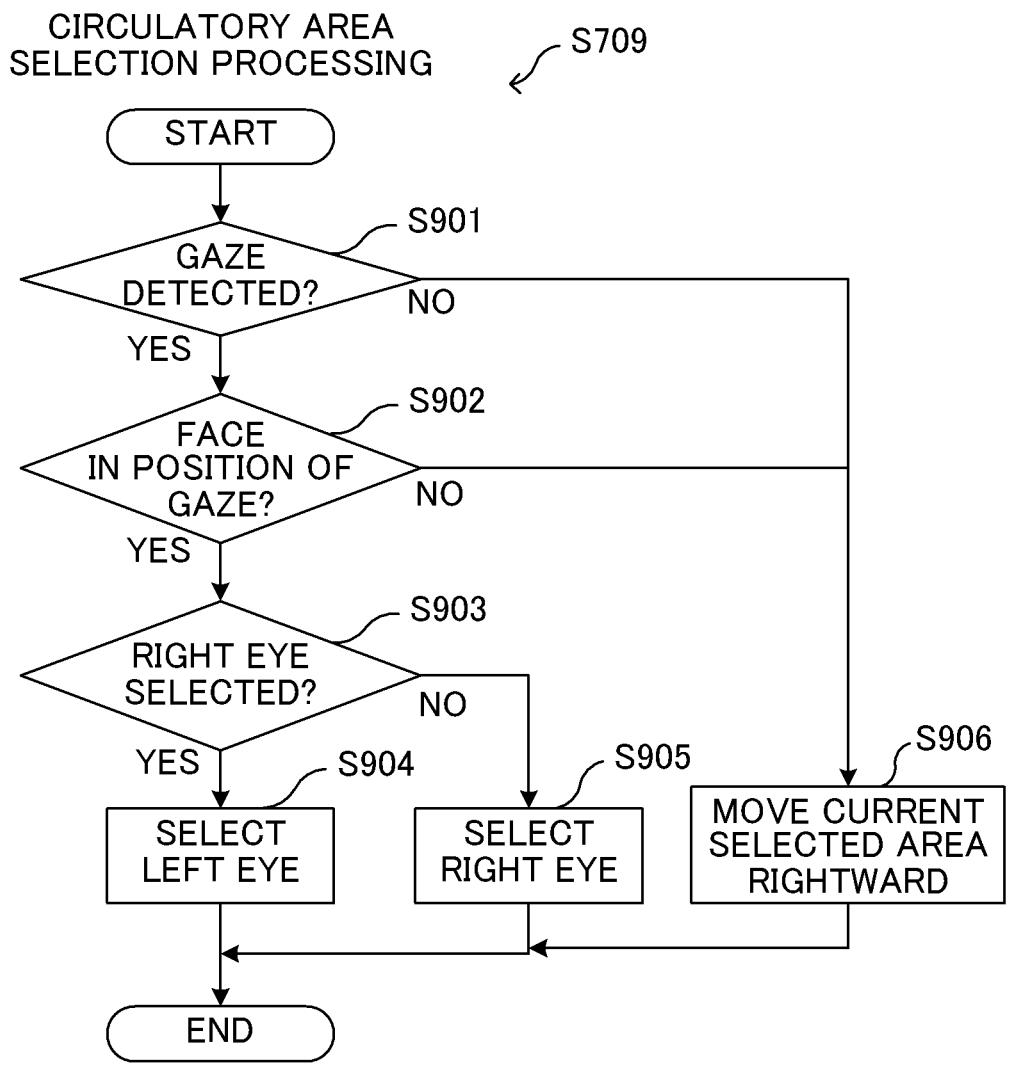

ELECTRONIC DEVICE AND CONTROL METHOD FOR ELECTRONIC DEVICE

BACKGROUND OF THE INVENTION

Field of the Invention

The present invention relates to an electronic device capable of receiving gaze input, and a control method for the electronic device.

Description of the Related Art

Recently, techniques for performing area selection using gaze input have become available in electronic devices. Gaze input is detected by a gaze input device connected to a PC or an input device of game, for example, and used to move the position of a mouse pointer or for various game operations. Further, an imaging device having a gaze input function uses gaze input to select a distance measurement area within an observation area of a viewfinder.

Japanese Patent Application Publication No. 2018-74200 discloses a technique for shortening the time required to select a desired measurement area from a plurality of measurement areas used to detect a focal state or to measure the distance to a subject. More specifically, the speed at which to modify the measurement area is modified in accordance with a positional relationship between the selected measurement area and the detected gaze.

To select a desired area within the observation area of the viewfinder, the user specifies areas in succession by operating an operating member or moves the selected area up, down, left, and right.

In Japanese Patent Application Publication No. 2018-74200, the time required to select an area can be shortened by modifying the movement speed of selecting areas, but it is desirable to further reduce the labor involved in the operation performed by the user to select the desired area.

SUMMARY OF THE INVENTION

The present invention provides an electronic apparatus which can achieve an improvement in operability when a user selects a desired area.

An electronic device of the present invention includes: a gaze detecting unit configured to detect a position of gaze input on an image displayed on a display unit; a subject detecting unit configured to detect from the image a subject of a specific type and a region included in the subject of the specific type; and a control unit configured to execute control so that, in a case where a position selected prior to a user operation on an operating member is not on the subject in the position of gaze input, a region corresponding to the user operation, which is included in the subject in the position of gaze input, is selected in response to the user operation, regardless of the position selected prior to the user operation.

Further features of the present invention will become apparent from the following description of exemplary embodiments with reference to the attached drawings.

BRIEF DESCRIPTION OF THE DRAWINGS

FIG. 8 is a flowchart showing an example of area selection processing using a direction selection operation; and FIG. 9 is a flowchart showing an example of area selection processing using a circulatory selection operation.

DESCRIPTION OF THE EMBODIMENTS

External View of Digital Camera

Figure 1A:
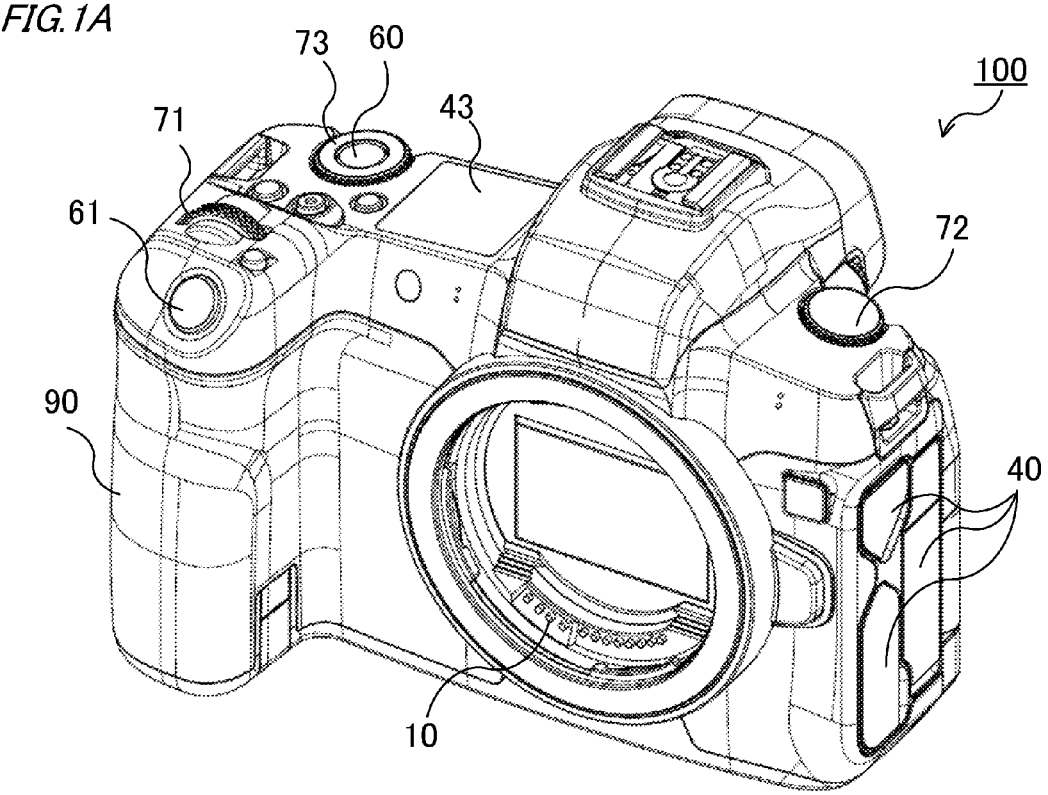
FIGS. 1A and 1B are external views of a digital camera.
Figure 1B:
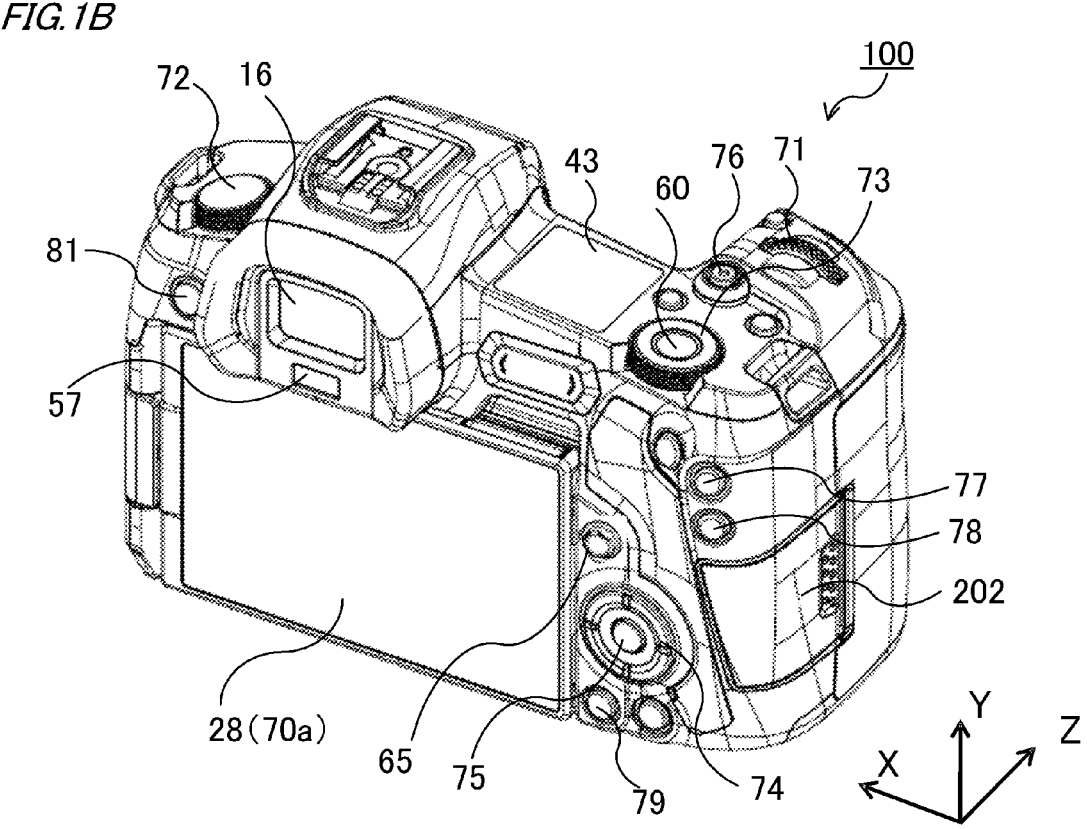

A preferred embodiment of the present invention will be described below with reference to the figures. FIGS. 1A and 1B are external views showing a digital camera 100 serving as an example of an electronic device to which the present invention can be applied. FIG. 1A is a perspective front view of the digital camera 100, and FIG. 1B is a perspective back view of the digital camera 100.

A display unit 28 is a display unit provided on the back surface of the digital camera 100 in order to display images and various information. A touch panel 70a is capable of detecting touch operations performed on a display surface (a touch operation surface) of the display unit 28. A viewfinder external display unit 43 is a display unit provided on an upper surface of the digital camera 100 in order to display various setting values of the digital camera 100, such as the shutter speed and the aperture. A shutter button 61 is an operating member used to issue an imaging instruction. A mode-switching switch 60 is an operating member used to switch between various modes. A terminal cover 40 is a cover for protecting a connector (not shown) such as a connection cable for connecting the digital camera 100 to an external device.

A main electronic dial 71 is a rotary operating member, and by rotating the main electronic dial 71, setting values such as the shutter speed and the aperture can be modified and so on. A power supply switch 72 is an operating member for switching a power supply of the digital camera 100 ON and OFF. A sub-electronic dial 73 is a rotary operating member, and by rotating the sub-electronic dial 73, a selection frame (a cursor) can be moved, images can be scrolled, and so on.

A four-direction key 74 is configured so that up, down, left, and right parts thereof can be pressed, whereby processing corresponding to the part of the four-direction key 74 that is pressed can be performed. A SET button 75 is a push-button used mainly to determine a selection item and so on.

A moving image button 76 is used to issue an instruction to start or stop moving image capture (recording) in a moving image capture mode. An AE lock button 77 is a push-button, and by pressing the AE lock button 77 in an imaging standby state, an exposure state can be fixed. A zoom button 78 is a button for switching a zoom mode ON and OFF during live view display in an imaging mode. By switching the zoom mode ON and then operating the main electronic dial 71, a live view image can be enlarged or reduced. The zoom button 78 also functions as a button for enlarging a reproduced image and increasing the magnification in a reproduction mode.

A reproduction button 79 is an operating button for switching between the imaging mode and the reproduction mode. By pressing the reproduction button 79 in the imaging mode, the mode is shifted to the reproduction mode, whereby the newest image among images recorded on a recording medium 200 (to be described below using FIG. 2) can be displayed on the display unit 28.

A menu button 81 is a push-button used to perform an instruction operation to display a menu screen, and when the menu button 81 is pressed, a menu screen on which various settings can be performed is displayed on the display unit 28. A user can perform various settings intuitively using the menu screen displayed on the display unit 28, the four-direction key 74, the SET button 75, or a multi-controller (MC hereafter) 65. The MC 65 receives direction instructions in eight directions and a pressing operation in a central part.

A communication terminal 10 is a communication terminal used by the digital camera 100 to communicate with a (detachable) lens side. An eyepiece unit 16 serves as an eyepiece unit of an eyepiece viewfinder (a look-through viewfinder), and through the eyepiece unit 16, the user can view video displayed on an internal EVF (Electric Viewfinder) 29. An eye approach detection unit 57 is an eye approach detection sensor for detecting whether or not the eye of the photographer has approached the eyepiece unit 16.

A lid 202 is a lid on a slot housing the recording medium 200. A grip portion 90 is a holding portion shaped so that the user can easily grip the digital camera 100 with his/her right hand while holding the digital camera 100. When the digital camera is held while gripping the grip portion 90 with the little finger, the ring finger, and the middle finger of the right hand, the shutter button 61 and the main electronic dial 71 are disposed in positions enabling operation thereof by the index finger of the right hand. Further, in the same state, the sub-electronic dial 73 is disposed in a position enabling operation thereof by the thumb of the right hand.

Block Diagram of Digital Camera

Figure 2:
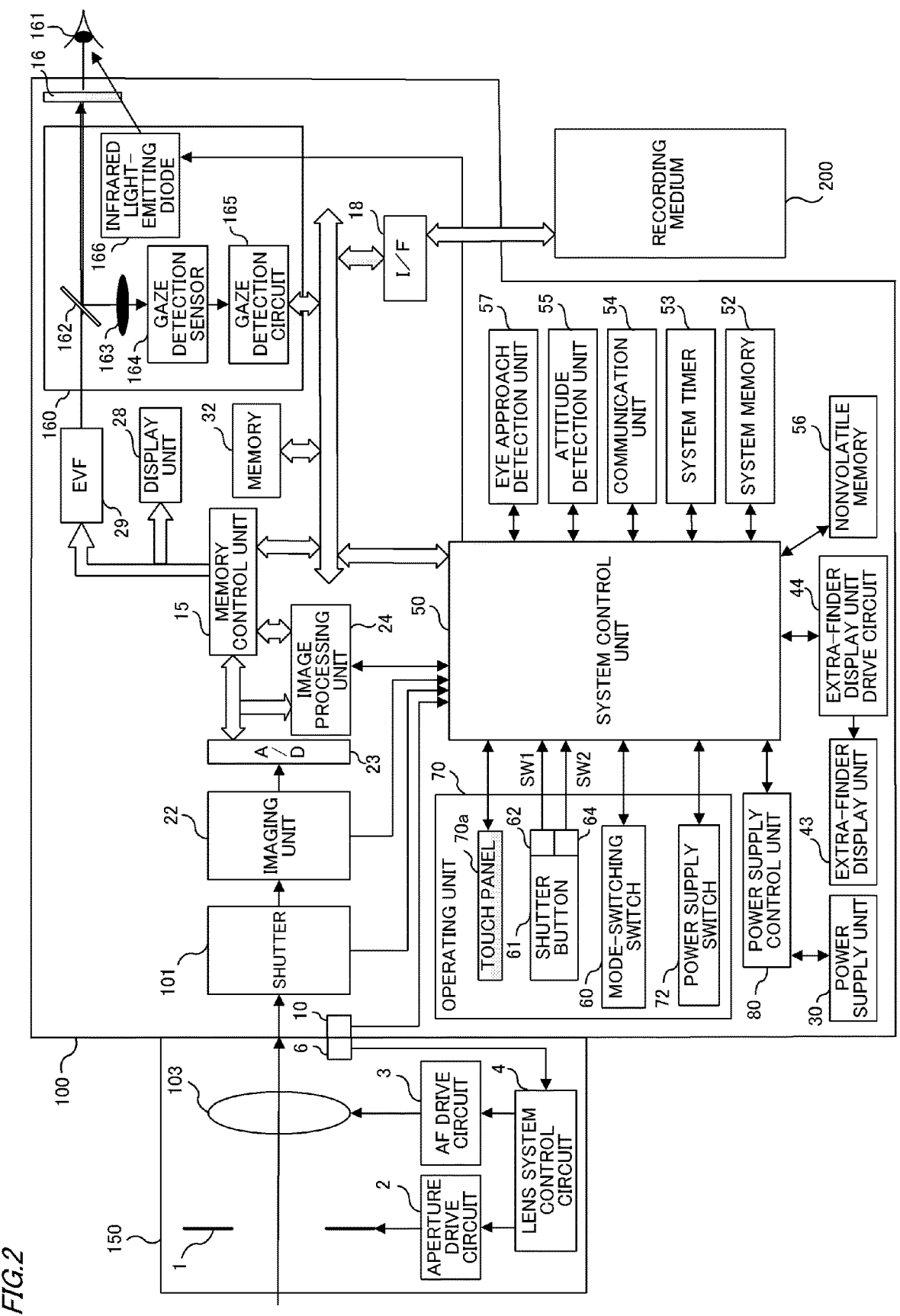
FIG. 2 is a block diagram showing an example configuration of the digital camera.

FIG. 2 is a block diagram showing an example configuration of the digital camera 100. A lens unit 150 is a lens unit installed with an exchangeable imaging lens. A lens 103 is normally constituted by a plurality of lenses, but for the sake of simplicity, FIG. 2 shows only one lens.

A communication terminal 6 is a communication terminal used by the lens unit 150 to communicate with the digital camera 100 side, while the communication terminal 10 is a communication terminal used by the digital camera 100 to communicate with the lens unit 150 side. The lens unit 150 communicates with a system control unit 50 through the communication terminals 6, 10. The lens unit 150 uses a lens system control circuit 4 provided in the interior thereof to control an aperture 1 via an aperture drive circuit 2. The lens unit 150 also uses the lens system control circuit 4 to adjust the focus by displacing the lens 103 via an AF drive circuit 3.

A shutter 101 is a focal plane shutter capable of freely controlling the exposure time of the imaging unit 22 under the control of the system control unit 50.

An imaging unit 22 is an image sensor constituted by a CCD, a CMOS element, or the like for converting an optical image into an electric signal. An A/D converter 23 converts an analog signal output from the imaging unit 22 into a digital signal.

An image processing unit 24 performs predetermined processing (pixel interpolation, resizing processing such as reduction, color conversion processing, and so on) on data from the A/D converter 23 or data from a memory control unit 15. Further, the image processing unit 24 performs predetermined calculation processing using captured image data. The system control unit 50 performs exposure control and distance measurement control on the basis of a calculation result acquired by the image processing unit 24. Thus, AF (AutoFocus) processing, AE (Automatic Exposure) processing, EF (Electronic Flash pre-emission) processing, and so on are performed using a TTL (Through-The-Lens) method. The image processing unit 24 also performs predetermined calculation processing using the captured image data, and performs TTL type AWB (Automatic White Balance) processing on the basis of an acquired calculation result.

The memory control unit 15 controls the exchange of data between the A/D converter 23, the image processing unit 24, and a memory 32. Output data from the A/D converter 23 are written to the memory 32 via the image processing unit 24 and the memory control unit 15. Alternatively, the output data from the A/D converter 23 are written to the memory 32 via the memory control unit 15 without passing through the image processing unit 24. The memory 32 stores image data acquired by the imaging unit 22 and converted into digital data by the A/D converter 23, and image data to be displayed on the display unit 28 or the EVF 29. The memory 32 has a sufficient storage capacity to store a predetermined number of static images, or moving images and audio of a predetermined length.

Further, the memory 32 doubles as an image display memory (a video memory). The display image data written to the memory 32 are displayed by the display unit 28 or the EVF 29 via the memory control unit 15. The display unit 28 and the EVF 29 respectively perform display corresponding to signals from the memory control unit 15 on a display device such as an LCD or an organic EL display. By successively transferring data subjected to A/D conversion by the A/D converter 23 and stored in the memory 32 to the display unit 28 or the EVF 29 and displaying the data thereon, live view display (LV display) is performed. An image displayed by live view display will be referred to hereafter as a live view image (an LV image).

A gaze detection block 160 detects the gaze of the user through the eyepiece unit 16. The gaze detection block 160 is constituted by a dichroic mirror 162, an imaging lens 163, a gaze detection sensor 164, a gaze detection circuit 165, and an infrared light-emitting diode 166.

The infrared light-emitting diode 166 is a light-emitting element for detecting the gaze position of the user in a viewfinder screen by irradiating the eyeball (the eye) 161 of the user with infrared light. The infrared light emitted from the infrared light-emitting diode 166 is reflected by the eyeball (the eye) 161, and the resulting infrared reflection light reaches the dichroic mirror 162. The dichroic mirror 162 reflects only infrared light while transmitting visible light. The infrared reflection light having an altered optical path forms an image on an image-forming surface of the gaze detection sensor 164 via the imaging lens 163. The imaging lens 163 is an optical member forming a gaze detection optical system. The gaze detection sensor 164 is constituted by an imaging device such as a CCD image sensor.

The gaze detection sensor 164 photoelectrically converts the infrared reflection light that is incident thereon into an electric signal, and outputs the electric signal to the gaze detection circuit 165. The gaze detection circuit 165 detects the gaze position of the user from the movement of the eyeball (the eye) 161 of the user on the basis of an output signal from the gaze detection sensor 164, and outputs detection information to the system control unit 50.

The gaze detection block 160 can detect the gaze using a method known as the corneal reflection method, for example. The corneal reflection method is a method for detecting the orientation and position of the gaze from a positional relationship between the reflection light generated when the infrared light emitted from the infrared light-emitting diode 166 is reflected mainly by the cornea of the eyeball (the eye) 161 and the pupil of the eyeball (the eye) 161. The method for detecting the orientation and position of the gaze is not limited to the corneal reflection method, and various other methods, such as a method known as the sclera reflection method, which uses the difference in light reflectance between the black and white sections of the eye, may be used instead. As long as the orientation and position of the gaze can be detected, the gaze detection block 160 may use a method other than those described above.

Various camera setting values, such as the shutter speed and the aperture, are displayed on the viewfinder external display unit 43 via a viewfinder external display unit drive circuit 44.

A nonvolatile memory 56 is an electrically erasable/recordable memory such as a Flash-ROM, for example. Operation constants of the system control unit 50, a program, and so on are recorded on the nonvolatile memory 56. Here, the program is a program for executing the various flowcharts of this embodiment, to be described below.

The system control unit 50 is a control unit constituted by at least one processor or circuit, and controls the entire digital camera 100. The system control unit 50 realizes the various types of processing of this embodiment, to be described below, by executing the aforesaid program recorded on the nonvolatile memory 56. A system memory 52 is a RAM, for example, and the system control unit 50 expands operation constants and variables of the system control unit 50, the program read from the nonvolatile memory 56, and so on in the system memory 52. The system control unit 50 also performs display control by controlling the memory 32, the display unit 28, and so on.

A system timer 53 is a timing unit for measuring the time used for various types of control and the time on an inbuilt clock.

A power supply control unit 80 is constituted by a battery detection circuit, a DC-DC converter, a switch circuit for switching an energized block, and so on, and detects whether or not a battery is attached, the type of the battery, the remaining battery charge, and so on. Further, the power supply control unit 80 controls the DC-DC converter on the basis of the detection results acquired thereby and an instruction from the system control unit 50 so as to supply required voltages to respective parts, including the recording medium 200, for required periods. A power supply unit 30 is constituted by a primary battery such as an alkali battery or a lithium battery, a secondary battery such as an NiCd battery, an NiMH battery, or an Li battery, an AC adapter, or the like.

A recording medium I/F 18 is an interface with the recording medium 200, which is constituted by a memory card, a hard disk, or the like. The recording medium 200 is a recording medium such as a memory card on which to record captured images, and is constituted by a semiconductor memory, a magnetic disk, or the like.

A communication unit 54 exchanges video signals and audio signals with an external device connected either wirelessly or by a wire cable. The communication unit 54 can also be connected to a wireless LAN (Local Area Network) or the Internet. The communication unit 54 is also capable of communicating with the external device by Bluetooth (registered trademark) or Bluetooth Low Energy. The communication unit 54 is capable of transmitting an image (including an LV image) captured by the imaging unit 22 or an image recorded on the recording medium 200 and of receiving image data and various other information from the external device.

An attitude detection unit 55 detects the attitude of the digital camera 100 relative to the direction of gravity. On the basis of the attitude detected by the attitude detection unit 55, it is possible to determine whether an image captured by the imaging unit 22 is an image captured with the digital camera 100 held horizontally or an image captured with the digital camera 100 held vertically. The system control unit 50 is capable of attaching orientation information corresponding to the attitude detected by the attitude detection unit 55 to an image file of the image captured by the imaging unit 22 and of recording the image after rotating the image. An acceleration sensor, a gyro sensor, or the like can be used as the attitude detection unit 55. Movement of the digital camera 100 (panning, tilting, picking up, whether or not the digital camera 100 is stationary, and so on) can also be detected using the acceleration sensor or the gyro sensor serving as the attitude detection unit 55.

The eye approach detection unit 57 is an eye approach detection sensor for detecting (approach-detecting) the approach (eye approach) and withdrawal (eye withdrawal) of the eye (an object) 161 to and from the eyepiece unit 16 of the viewfinder. The system control unit 50 switches the display unit 28 and the EVF 29 between display (a display state) and non-display (a non-display state) in accordance with the state detected by the eye approach detection unit 57. More specifically, in at least the imaging standby state, when a display destination switch setting is set at automatic switching and an eye has not approached, the display unit 28 is set as the display destination and display thereon is switched ON, while the EVF 29 is set at non-display. Further, when an eye has approached, the EVF 29 is set as the display destination and display thereon is switched ON, while the display unit 28 is set at non-display.

An infrared proximity sensor, for example, can be used as the eye approach detection unit 57 so that the eye approach detection unit 57 is capable of detecting the approach of an object of some type toward the eyepiece unit 16 of the viewfinder in which the EVF 29 is installed. When the object approaches, infrared light projected from a light projection unit (not shown) of the eye approach detection unit 57 is reflected by the object and received by a light reception unit (not shown) of the infrared proximity sensor. The distance (the eye approach distance) of the object from the eyepiece unit 16 can be determined from the quantity of the received infrared light. Thus, the eye approach detection unit 57 performs eye approach detection to detect the distance of an object from the eyepiece unit 16.

Note that the light projection unit and the light reception unit of the eye approach detection unit 57 may be constituted by separate devices to the infrared light-emitting diode 166 and the gaze detection sensor 164 described above. Alternatively, the infrared light-emitting diode 166 may double as the light projection unit of the eye approach detection unit 57. Further, the gaze detection sensor 164 may double as the light reception unit.

When an object that has approached the eyepiece unit 16 to within a predetermined distance is detected from an eye non-approach state (a non-approach state), this is detected as eye approach. When, from an eye approach state (an approach state), an object withdraws by at least a predetermined distance after the approach thereof has been detected, this is detected as eye withdrawal. The threshold for detecting eye approach and the threshold for detecting eye withdrawal may be set differently by providing hysteresis or the like, for example. Further, after detecting eye approach, it is assumed that the eye approach state remains established until eye withdrawal is detected. After detecting eye withdrawal, it is assumed that the eye non-approach state remains established until eye approach is detected. Note that an infrared proximity sensor is an example, and any other sensor capable of detecting the approach of an eye or an object as eye approach may be used as the eye approach detection unit 57.

The system control unit 50 is capable of detecting the following operations or states in relation to the eyepiece unit 16 on the basis of output from the gaze detection block 160 or the eye approach detection unit 57.

A gaze not oriented toward the eyepiece unit 16 is newly oriented toward the eyepiece unit 16. In other words, the start of gaze input.

A stale in which gaze is input into the eyepiece unit 16.

A gaze oriented toward the eyepiece unit 16 is withdrawn, in other words, the end of gaze input.

A state in which no gaze is input into the eyepiece unit 16. Here, being focused denotes a case in which the gaze position of the user does not exceed a predetermined movement amount within a predetermined time.

The system control unit 50 is notified of these operations/states, as well as the position (direction) in which the gaze is oriented toward the eyepiece unit 16, through an internal bus, and on the basis of the notified information, the system control unit 50 determines the nature of the operation (the gaze operation) performed on the eyepiece unit 16.

An operating unit 70 is an input unit for receiving operations (user operations) from the user, and is used to input various operation instructions into the system control unit 50. As shown in FIG. 2, the operating unit 70 includes the mode-switching switch 60, the shutter button 61, the power supply switch 72, the touch panel 70a, and so on. The operating unit 70 also includes the following operating members as other operating members. More specifically, the operating unit 70 includes the multi-controller 65, the main electronic dial 71, the sub-electronic dial 73, the four-direction key 74, the SET button 75, the moving image button 76, the AF lock button 77, the zoom button 78, the reproduction button 79, the menu button 81, and so on.

The mode-switching switch 60 switches the operation mode of the system control unit 50 between the static image capture mode, the moving image capture mode, the reproduction mode, and so on. Modes included in the static image capture mode include an automatic imaging mode, an automatic scene discrimination mode, a manual mode, an aperture priority mode (an Av mode), a shutter speed priority mode (a Tv mode), and a program AE mode (a P mode). Various scene modes serving as imaging settings for different imaging scenes, a custom mode, and so on also exist. The user can switch between these modes directly using the mode-switching switch 60. Alternatively, the mode-switching switch 60 can be used to switch to an imaging mode list screen, whereupon another operating member can be used to switch selectively to one of the plurality of displayed modes. The moving image capture mode may also include a plurality of modes.

The shutter button 61 includes a first shutter switch 62 and a second shutter switch 64. The first shutter switch 62 is switched ON midway through an operation of the shutter button 61, i.e. when the shutter button 61 is half-pressed (an imaging preparation instruction), whereby a first shutter switch signal SW1 is generated. In response to the first shutter switch signal SW1, the system control unit 50 starts imaging preparation operations such as AF (autofocus) processing, AE (automatic exposure) processing, AWB (automatic white balance) processing, and EF (Electronic Flash pre-emission) processing.

The second shutter switch 64 is switched ON at the end of the operation of the shutter button 61, i.e. when the shutter button 61 is fully pressed (an imaging instruction), whereby a second shutter switch signal SW2 is generated. In response to the second shutter switch signal SW2, the system control unit 50 starts a series of imaging processing operations from reading a signal from the imaging unit 22 to writing a captured image to the recording medium 200 in the form of an image file.

The touch panel 70a and the display unit 28 can be formed integrally. For example, the touch panel 70a is configured such that the light transmittance thereof does not impede display on the display unit 28, and is mounted on an upper layer of the display surface of the display unit 28. Input coordinates on the touch panel 70a are associated with display coordinates on the display surface of the display unit 28. Thus, a GUI (a Graphical User Interface) that simulates a configuration in which the user can directly operate the screen displayed on the display unit 28 can be provided. The system control unit 50 can detect the following operation or states on the touch panel 70a.

A finger or a pen that has not yet touched the touch panel 70a newly touches the touch panel 70a, or in other words, a touch begins (referred to hereafter as a touch-down)

The finger or pen is in a state of touching the touch panel 70a (referred to hereafter as a touch-on.

The finger or pen is moved while still touching the touch panel 70a (referred to hereafter as a touch-move).

The finger or pen touching the touch panel 70a is removed (released) from the touch panel 70a, or in other words, the touch ends (referred to hereafter as a touch-up).

Nothing touches the touch panel 70a (referred to hereafter as a touch-off).

When a touch-down is detected, a touch-on is detected at the same time. Normally, following a touch-down, a touch-on is detected continuously until a touch-up is detected. Likewise when touch-move is detected, a touch-on is detected at the same time. Even when a touch-on is detected, a touch-move is not detected unless the touch position moves. When it is detected that all touching fingers and pens have performed a touch-up, a touch-off is detected.

The system control unit 50 is notified of these operations and states, as well as the coordinates of the position in which the finger or pen is touching the touch panel 70a, via the internal bus. On the basis of the notified information, the system control unit 50 determines the nature of the operation (the touch operation) being performed on the touch panel 70a.

With regard to a touch-move, the movement direction in which the finger or pen moves over the touch panel 70a can be determined for each vertical component and each horizontal component on the touch panel 70a on the basis of variation in the position coordinates. When a touch-move of at least a predetermined distance is detected, it is determined that a sliding operation has been performed. An operation in which a finger is moved quickly by a certain distance while touching the touch panel 70*a* and then released is known as a flick. In other words, a flick is an operation for quickly stroking the touch panel 70*a* with a finger in a flicking motion. When a touch-move of at least a predetermined distance and at least a predetermined speed is detected, and a touch-up is detected immediately thereafter, it can be determined that a flick has been performed (it can be determined that a flick has been performed immediately after a sliding operation).

Further, a touch operation in which a plurality of locations (two points, for example) are touched together (multi-touched) and the touch positions are brought closer together is known as a pinch-in, while a touch operation in which the touch operations are moved further away from each other is known as a pinch-out. A pinch-in and a pinch-out are referred to collectively as a pinching operation (or simply as a pinch). A touch panel using any of various systems, such as a resistive film system, an electrostatic capacitance system, a surface acoustic wave system, an infrared system, an electromagnetic induction system, an image recognition system, or an optical sensor system, may be used as the touch panel 70*a*. Either a system that detects contact with the touch panel as a touch or a system that detects the approach of a finger or a pen toward the touch panel as a touch may be used.

A touch-move operation performed in the eye approach state will now be described. The user can set a method for specifying the position of a position index (an AF frame, for example) corresponding to a touch-move operation to either absolute position specification or relative position specification. For example, it is assumed that the position index is an AF frame. When the specification method is absolute position specification, the AF frame is set in the touch-down position (the coordinate input position) on the touch panel 70*a*. The AF frame then moves together with the touch position in response to a touch-move operation. In other words, the position coordinates of a touch operation are associated with position coordinates on the display unit 28. When the specification method is relative position specification, on the other hand, the position coordinates of a touch operation are not associated with position coordinates on the display unit 28. In relative position specification, the AF frame moves in the movement direction of the touch-move operation from the position of the currently set AF frame by a distance corresponding to the movement amount of the touch-move, regardless of the position of the touch-down performed on the touch panel 70*a*.

Area Selection Operations
Area Selection Using Gaze Input

Figure 3:
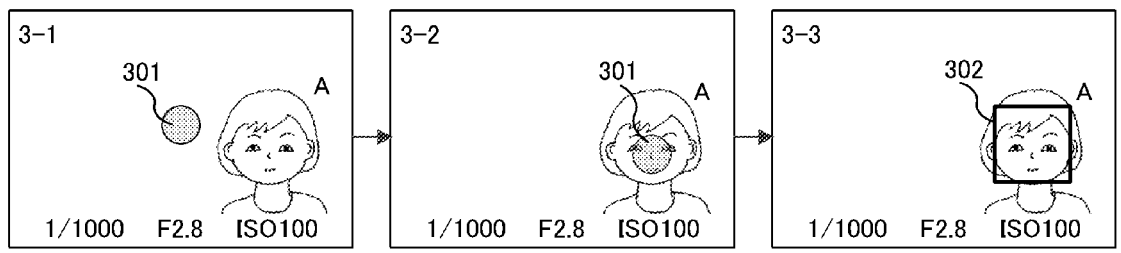
FIG. 3 is a view illustrating an area selection operation using gaze input.

FIG. 3 is a view illustrating an area selection operation using gaze input. The gaze detection block 160 of the digital camera 100 detects gaze input from the user. In response to a selection operation performed by the user, the system control unit 50 selects an area in accordance with the position of the detected gaze. An image 3-1 to an image 3-3 are display images displayed on the EVF 29 or the display unit 28 (a TFT liquid crystal display, for example) serving as display means. Using these images, movement of a selected area in response to an area selection operation performed using gaze input will now be described. Detection by the gaze detection block 160 can be set ON or OFF by a user operation.

The image 3-1 is an image displayed when the power supply of the gaze detection block 160 is switched ON. A gaze pointer 301 is an area indicating the position (the gaze input position) of the gaze of the user, detected by the gaze detection block 160.

The image 3-2 is an image showing a state in which the user has moved the position of his/her gaze to a subject A. The gaze pointer 301 is displayed so as to be superimposed on the subject A. The user can move the gaze pointer 301 to a desired position by moving the position of his/her gaze.

The image 3-3 is an image showing a state in which the user has executed an area selection operation on the operating unit 70. A selected area 302 indicates the area selected as a result of the selection operation performed by the user. When the user executes the selection operation, the system control unit 50 selects the subject A, which is displayed near the gaze pointer 301, as the selected area 302. By selecting an area using gaze input, smooth operability is realized. Note that in the example of FIG. 3, the face of a person is selected as the selected area 302, but the selection target is not limited to the face of a person and may be set as a person, an organ of a person, such as an eye or a mouth, an animal, an organ of an animal, a vehicle, a component of a vehicle, and so on. The image processing unit 24 can detect the subjects serving as the selection targets by analyzing the image under the control of the system control unit 50.

Area Selection Using Operating Unit

Figure 4:
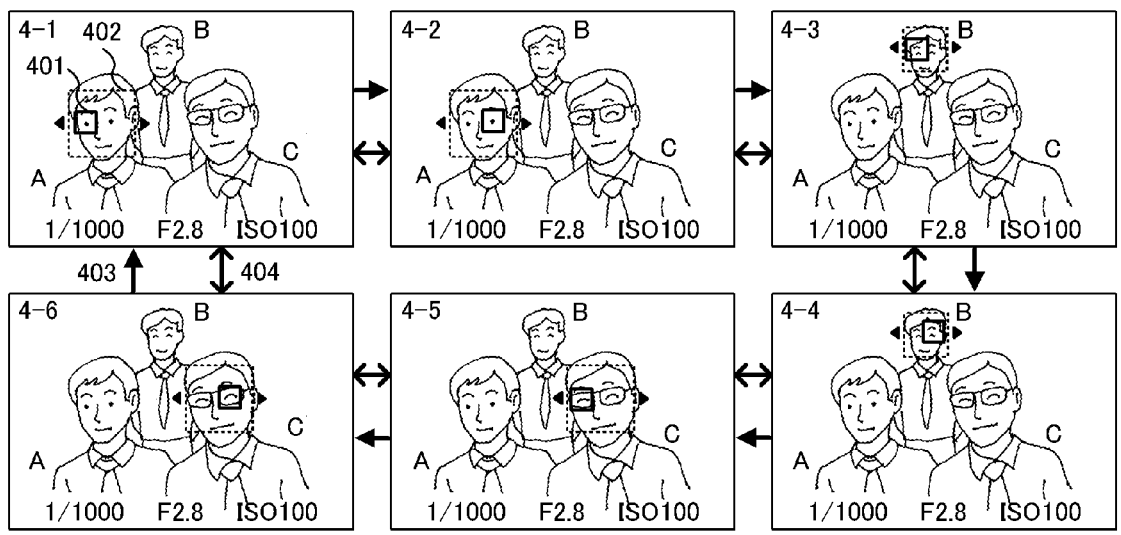
FIG. 4 is a view illustrating an area selection operation performed using an operating unit.

FIG. 4 is a screen transition diagram illustrating a case in which an area selection operation is performed by the operating unit without using gaze input (a case in which gaze input is disabled in advance, for example). The user can select an area by performing an operation using the operating unit 70. FIG. 4 shows an example of a case in which (eyes are set as the selection targets on an LV image on which a plurality of subjects A to C appear. In other words, the system control unit 50 selects an area (an eye) from among the left and right eyes of the respective subjects A to C in accordance with the user operation. A display example 4-1 to a display example 4-6 are display examples displayed on the EVF 29 or the display unit 28, and show the flow of area selection by a user operation.

The user operation is a circulatory selection operation or a left-right selection operation, for example. The circulatory selection operation is an operation in which, every time the user presses a button (the SET button 75, for example) included in the operating unit 70, the selected area currently selected is moved to another selection target in a circulatory motion performed in a predetermined direction. The selection targets are a specific type of subject, such as a face, and organs such as an eye, a nose, or a mouth (regions included in the subject).

The left-right selection operation is an operation for moving the selected area to an organ on the side of a direction selected by the user using the tour-direction key 74, for example. Similarly to the circulatory selection operation, in a case where a gaze input position is not detected, the selected area is moved to the organ on the side of the selected direction, regardless of the direction within the subject.

First, the flow of area selection (movement of the selected area) realized by the circulatory selection operation will be described. The flow of area selection realized by the circulatory selection operation is illustrated by single-headed arrows 403 depicted between the images on the display examples 4-1 to 4-6. A selected area 401 shown on the display example 4-1 is the area selected by the user operation, and the selected area 401 is indicated in a similar manner, using a solid-line rectangle, on the other display examples 4-2 to 4-6. Further, an area 402 indicated by a dotted-line rectangle on the display example 4-1 is an area denoting the face that serves as the subject that includes the selected area 401, and the area 402 is indicated in a similar manner, using a dotted-line rectangle, on the other display examples 4-2 to 4-6. Furthermore, on each image, the side displaying the subject A and the side displaying the subject C will be described as the left side and the right side, respectively.

Every time the button used for the circulatory selection operation (the SET button 75, for example) is pressed, the system control unit 50 moves the selected area 401 from the currently selected area to the selection target on the side of a predetermined direction. Each time the SET button 75 is pressed in the state of the display example 4-1, the display example transitions successively to the display example 4-2, the display example 4-3, the display example 4-4, the display example 4-5, the display example 4-6, and the display example 4-1. When the SET button 75 is pressed once in the state of the display example 4-1, the system control unit 50 transitions to the display example 4-2, whereby the selected area 401 is moved from the left eye of the subject A to the right eye of the subject A. Further, when the SET button 75 is pressed once in the state of the display example 4-2, the system control unit 50 transitions to the display example 4-3, whereby the selected area 401 is moved from the right eye of the subject A to the left eye of the subject B. The left eye of the subject B, which is newly selected by pressing the SET button 75, is the eye positioned closest to the right eye of the subject A, which was selected previously, among the eyes on the right side of the right eye of the subject A. At this time, an eye of the subject A is switched to an eye of the subject B, and therefore an eye of a different subject is selected. Note that in FIG. 4, a rightward direction is set as the predetermined direction, but the predetermined direction is not limited to a rightward direction and may also be a leftward direction or a downward direction.

Further, where there are no selection target eyes on the right side, the selected area 401 returns to the selection target at the left end. More specifically, when transitioning from the display example 4-6 to the display example 4-1, the system control unit 50 moves the selected area 401 from the right eye of the subject C to the left eye of the subject A. Thus, the selected area 401 moves around the selection targets in the image in a circulatory motion.

Next, the flow of area selection (modification of the selected area) realized by the left-right selection operation will be described. The flow of area selection realized by the left-right selection operation is illustrated by double-headed arrows 404 depicted between the images on the display examples 4-1 to 4-6.

When an operation for selecting the rightward direction (a first direction) is executed using the four-direction key 74, which is used for the purpose of the left-right selection operation, the system control unit 50 moves the selected area 401 to the selection target on the rightward direction side (the right side) of the currently selected area. Further, when an operation for selecting the leftward direction (a second direction) is executed, the system control unit 50 moves the selected area 401 to the selection target on the leftward direction side (the left side) of the currently selected area.

More specifically, when an operation for selecting (specifying) the rightward direction is executed on the display image 4-1, the system control unit 50 moves the selected area 401 from the left eye to the right eye of the subject A, as shown on the display example 4-2. Further, when an operation for selecting the leftward direction is executed on the display image 4-1, the system control unit 50 moves the selected area 401 from the left eye of the subject A to the right eye of the subject C serving as the selection target on the left side, as shown on the display example 4-6. The operation for specifying the rightward direction is performed by pressing the right key once, for example. The operation for specifying the leftward direction is performed by pressing the left key once, for example.

By performing the circulatory selection operation or the left-right selection operation, the user can select a desired area, such as the face of a person or an organ of a person, from among one or more subjects. Note that the operating member that receives the circulatory selection operation or the left-right selection operation is not limited to the above example. For example, the left-right selection operation may be set as a rotation operation (a dial operation) performed on a rotary dial, and the selected area 401 may be moved in accordance with the rotation amount and rotation direction of the dial. Alternatively, selection operations may be performed in eight directions, including left and right, and the selected area 401 may be moved in the selected direction.

Area Selection Using Gaze Input and Circulatory Selection Operation

Figure 5A:
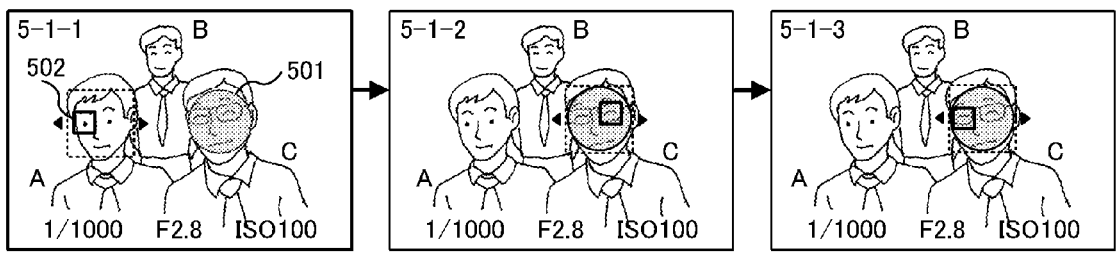
FIGS. 5A to 5C are views illustrating area selection performed using gaze input and a circulatory selection operation.
Figure 5B:
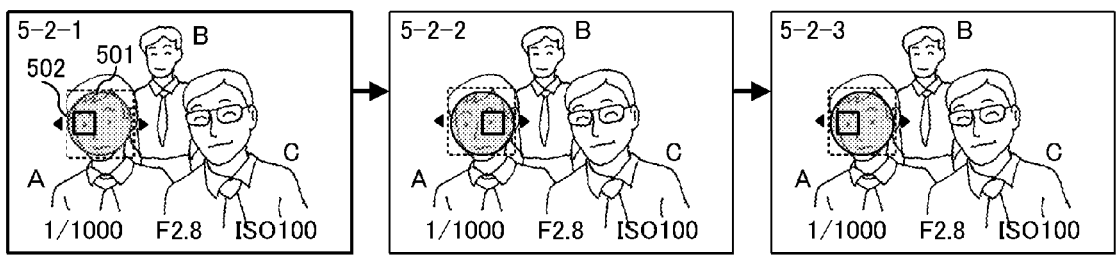
Figure 5C:
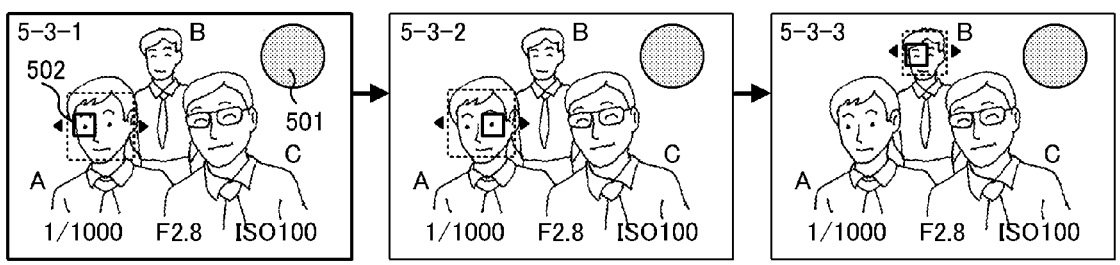

FIGS. 5A to 5C are screen transition diagrams illustrating a case in which the circulatory selection operation is performed by the operating unit using gaze input (a case in which gaze input is enabled in advance, for example). The subjects on the respective display examples in FIGS. 5A to 5C are in a similar state to FIG. 4, and FIGS. 5A to 5C show examples of a case in which eyes are set as the selection targets on LV image on which the plurality of subjects A to C appear. A gaze pointer 501 is an area showing the position of the gaze of the user (the gaze input position), which is detected by the gaze detection block 160. In this embodiment, an example in which the gaze pointer 501 is displayed will be described, but the position of the gaze detected by the gaze detection block 160 does not have to be displayed. A selected area 502 is an area selected by a user operation for selecting a subject. FIGS. 5A, 5B, and 5C illustrate three different patterns of the position of the gaze pointer 501.

A display example 5-1-1, a display example 5-2-1, and a display example 5-3-1 show states prior to execution of the circulatory selection operation. The left eye of the subject A has been selected as the area 502. The gaze pointer 501 is positioned near the subject C in display example 5-1-1, near the subject A in display example 5-2-1, and near the upper right end of the screen in display example 5-3-1. Area selection by the circulatory selection operation will be described below using display examples 5-1-2, 5-1-3, 5-2-2, 5-2-3, 5-3-2, and 5-3-3.

When the circulatory selection operation is executed (when the SET button 75 is pressed once, for example) on the display example 5-1-1 in FIG. 5A, the gaze pointer 501 is positioned on the subject C, and therefore the selected area 502 moves to the right eye of the subject C (display example 5-1-2). In other words, the selected area 502 moves to the right eye of the subject C, where the gaze pointer 501 is positioned, rather than to the right eye of the subject A. When the circulatory selection operation is executed (when the SET button 75 is pressed once, for example) in a continuous fashion on the display example 5-1-2 in FIG. 5A, the gaze pointer 501 is positioned on the subject C, and therefore the selected area 502 moves to the left eye of the subject C (display example 5-1-3). Thus, when the circulatory selection operation is executed in a continuous fashion, the selected area 502 moves in a circulatory manner around the respective organs of the subject C on which the gaze pointer 501 is positioned. The SET button need only be pressed once in order to select the right eye of the subject C, as on the display example 5-1-2, from a state in which the left eye of the subject A is selected, as on the display example 5-1-1. In other words, in comparison with the number of operations (four depressions of the SET button) required to select the right eye of the subject C, as on the display example 4-5, from a state in which the left eye of the subject A is selected, as on the display example 4-1, the selected area 502 can be moved with a smaller number of operation steps.

Note that in the circulatory selection operation for transitioning from the display example 5-1-1 to the display example 5-1-2, the selected area 502 moves to the right eye of the subject C, but as long as the movement destination is within the subject C, the selected area 502 may be moved to the left eye of the subject C, rather than the right eye. Alternatively, the organ of the subject C that is closest to the focus position, among the organs included in the subject on which the gaze pointer 501 is positioned, may be selected as the selected area 502.

When the circulatory selection operation is executed (when the SET button 75 is pressed once, for example) on the display example 5-2-1 in FIG. 5B, the gaze pointer 501 is positioned on the subject A, and therefore the selected area 502 moves to the right eye of the subject A (display example 5-2-2). When the circulatory selection operation is executed (when the SET button 75 is pressed once, for example) in a continuous fashion on the display example 5-2-2 in FIG. 5B, the gaze pointer 501 is positioned on the subject A, and therefore the selected area 502 moves to the left eye of the subject A (display example 5-2-3). Thus, when the circulatory selection operation is executed in a continuous fashion, the selected area 502 moves to an unselected organ among the organs of the subject A on which the gaze pointer 501 is positioned. In other words, the selected position does not move to a position on a subject (in this example, the subjects B and C) other than the subject in the gaze input position. As a result, operations that do not align with the intentions of the user, such as selecting a subject on which the user is not focused, are prevented from occurring.

When the circulatory selection operation is executed on the display example 5-3-1 in FIG. 5C, the gaze pointer 501 is positioned near the upper right end of the screen, where none of the subjects are detected, and therefore the selected area 502 moves to the right eye of the subject A (display example 5-3-2). In other words, when the gaze pointer 501 is not superimposed on any subject, the selected area 502 moves in accordance with the rules of the normal circulatory selection operation described using FIG. 4 (the rules of the circulatory selection operation not using gaze input). When the circulatory selection operation is executed in a continuous fashion on the display example 5-3-2 in FIG. 5C, the gaze pointer 501 is in a position where none of the subjects are detected, and therefore the selected area 502 moves to the left eye of the subject B (display example 5-3-3) in accordance with the rules of the normal circulatory selection operation. The circulatory selection operation is an operation for pressing the SET button 75 once, for example.

As described above, when the circulatory selection operation is executed, the selected area 502 moves to the organ of the subject on which the gaze pointer 501 is positioned. The selected area 502 moves in accordance with the position of the gaze pointer 501, and therefore the user can select the organs of the subject on which s/be is focused successively by repeating the circulatory selection operation. By using gaze input in this manner, the operability of area selection is improved.

Area Selection by Gaze Input and Left-Right Selection Operation

Figure 6A:
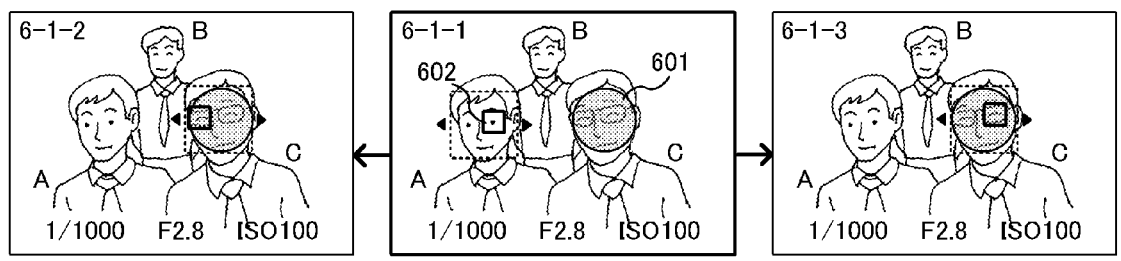
FIGS. 6A to 6C are views illustrating area selection performed using gaze input and a left-right selection operation.
Figure 6B:
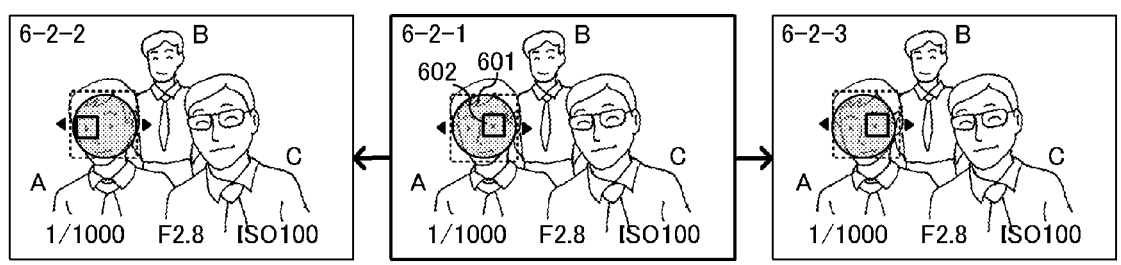
Figure 6C:
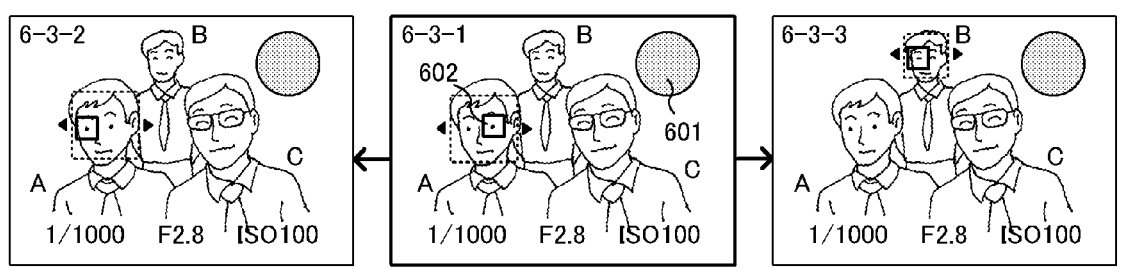

FIGS. 6A to 6C are screen transition diagrams illustrating a case in which the left-right selection operation is performed by the operating unit using gaze input (a case in which gaze input is enabled in advance, for example). The subjects on the respective display examples in FIGS. 6A to 6C are in a similar state to FIG. 4, and FIGS. 6A to 6C show examples of a case in which eyes are set as the selection targets on an LV image on which the plurality of subjects A to C appear. A gaze pointer 601 is an area showing the position of the gaze of the user (the gaze input position), which is detected by the gaze detection block 160. In this embodiment, an example in which the gaze pointer 601 is displayed will be described, but the position of the gaze detected by the gaze detection block 160 does not have to be displayed. A selected area 602 is an area selected by a user operation for selecting a subject. FIGS. 6A, 6B, and 6C illustrate three different patterns of the position of the gaze pointer 601.

A display example 6-1-1, a display example 6-2-1, and a display example 6-3-1 show states prior to execution of the left-right selection operation. On the display example 6-1-1 in the center, the right eye of the subject A has been selected as the area 602. The gaze pointer 601 is positioned near the subject C on the display example 6-1-1, near the subject A on the display example 6-2-1, and near the upper right end of the screen on the display example 6-3-1. Area selection using the left-right selection operation will be described below using display examples 6-1-2, 6-1-3, 6-2-2, 6-2-3, 6-3-2, and 6-3-3.

When an operation for selecting the leftward direction is executed as the left-right selection operation on the display example 6-1-1 in FIG. 6A, the gaze pointer 601 is positioned on the subject C, and therefore the selected area 602 moves to the left eye of the subject C (display example 6-1-2). In other words, the selected area 602 is not moved to the left eye of the subject A, and instead, an eye of the subject C on which the gaze pointer 601 is positioned is set as the selection target. The operation for specifying the leftward direction is an operation for pressing the left key once, for example. Further, when an operation for selecting the rightward direction is executed as the left-right selection operation, the gaze pointer 601 is positioned on the subject C, and therefore the selected area 602 moves to the right eye of the subject C (display example 6-1-3). The operation for specifying the rightward direction is an operation for pressing the right key once, for example. Hence, in response to a single direction selection operation, the selected area 602 moves within the subject C on which the gaze pointer 601 is positioned so as to select the eye of the subject C on the side of the selected direction, and as a result, user operability is improved. Moreover, a single depression of the right key is sufficient to select the right eye of the subject C, as on the display example 6-1-3, from the state in which the left eye of the subject A is selected, as on the display example 6-1-1. In other words, in comparison with the number of operations (four depressions of the SET button) required to select the right eye of the subject C, as on the display example 4-5, from a state in which the left eye of the subject A is selected, as on the display example 4-1, the selected area 602 can be moved with a smaller number of operation steps.

When an operation for selecting the leftward direction is executed as the left-right selection operation on the display example 6-2-1 in FIG. 6B, the gaze pointer 601 is positioned on the subject A, and therefore the selected area 602 moves to the left eye of the subject A (display example 6-2-2). The operation for specifying the leftward direction is an operation for pressing the left key once, for example. Further, when an operation for selecting the rightward direction is executed as the left-right selection operation, the gaze pointer 601 is positioned on the subject A, and therefore the selected area 602 does not move such that the right eye of the subject A continues to be selected (display example 6-2-3). The operation for specifying the rightward direction is an operation for pressing the right key once, for example. Hence, in response to a single direction selection operation, the eye of the subject A, on which the gaze pointer 601 is positioned, on the side of the selected direction is selected as the selected area 602, and as a result, user operability is improved. In other words, the selected position is not moved to a position on a subject (in this example, the subjects B and C) other than the subject in the gaze input position. As a result, operations that do not align with the intentions of the user, such as selecting a subject on which the user is not focused, are prevented from occurring.

When an operation for selecting the leftward direction is executed as the left-right selection operation on the display example 6-3-1 in FIG. 6C, the gaze pointer 601 is positioned near the upper right end of the screen, where none of the subjects are detected, and therefore the selected area 602 moves to the left eye of the subject A (display example 6-3-2). In other words, when the gaze pointer 601 is not superimposed on any subject, the selected area 602 moves in accordance with the rules of the normal left-right selection operation described using FIG. 4. The operation for specifying the leftward direction is an operation for pressing the left key once, for example. Further, when an operation for selecting the rightward direction is executed as the left-right selection operation, the gaze pointer 601 is in a position where none of the subjects are detected, and therefore the selected area 602 moves to the left eye of the subject B (display example 6-3-3) in accordance with the rules of the normal left-right selection operation. The operation for specifying the rightward direction is an operation for pressing the right key once, for example.

As described above, when the left-right selection operation is executed, the selected area 602 moves to an organ of the subject on which the gaze pointer 601 is positioned. When an operation for selecting the leftward direction is executed as the left-right selection operation, the selected area 602 moves to the organ (the eye) on the left side, and when an operation for selecting the rightward direction is executed, the selected area 602 moves to the organ (the eye) on the right side.

Note that in FIGS. 6A to 6C, the left-right selection operation is illustrated as an operation for selecting the rightward direction or the leftward direction, but the left-right selection operation is not limited thereto and may be an operation for selecting a direction other than left or right. For example, on the display example 6-2-1, when the head side of each subject is set as an upper side and the body side is set as a lower side, and an operation for selecting the lower side is executed, the selected area 602 can be moved to the mouth of the subject A. Operations for moving the selected area 602 in the left and right directions and directions other than the left and right directions will be referred to as direction selection operations.

The display images shown in FIGS. 3 to 6C are not limited to images displayed during imaging by the digital camera 100 and may be reproduced images of images captured by the digital camera 100 or images downloaded from an external device.

Flow of Area Selection Processing

Figure 7:
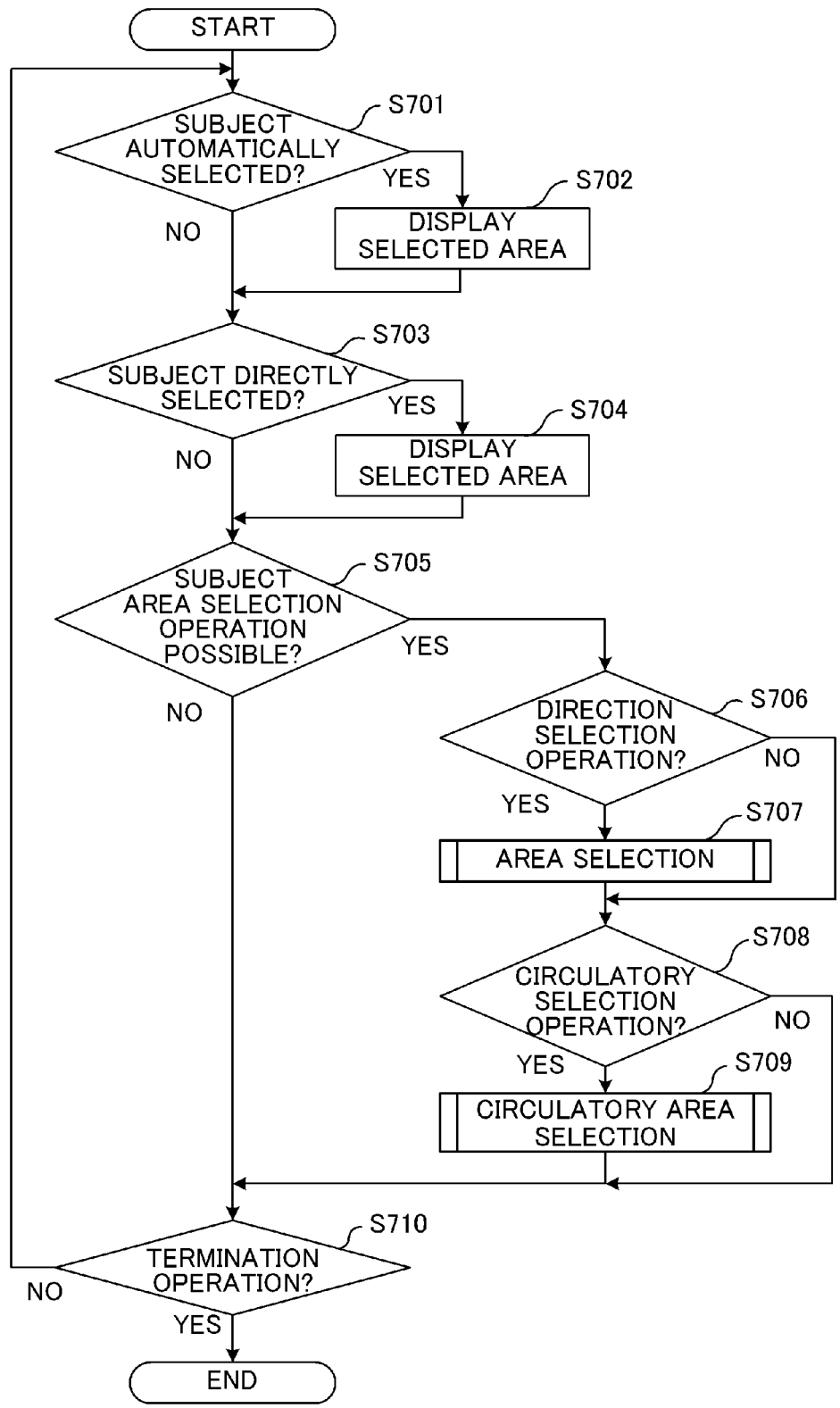
FIG. 7 is a flowchart showing an example of area selection processing using a direction selection operation.

Using FIGS. 7 to 9, area selection processing performed on an image displayed on the EVF 29 or the display unit 28 will be described. The area selection processing is processing performed during imaging processing or reproduction processing by the digital camera 100 to select and set a region included in a subject as the selected area. Using FIG. 7, a case of imaging processing will be described. The selected area selection method according to this embodiment can be used during imaging processing when selecting an AF area, a specific area to be tracked, a light measurement area (an area to serve as an AF reference), and so on. For example, when this embodiment is applied to movement of the AF frame in the imaging mode, AF is executed in the selected area. Further, the selected area selection method according to this embodiment can also be used during reproduction processing when selecting an area in which to implement image correction processing, an area to be cut out by trimming, or an area to which relationship information such as the names of the subjects and attribute information such as memos are to be attached. For example, when this embodiment is applied to an operation for selecting an eye to be subjected to red-eye correction in an image editing mode, red-eye correction processing is implemented on the eye in the selected area. Hence, in the imaging mode, the system control unit 50 executes specific processing such as autofocus, automatic exposure, and tracking subject determination on the basis of the selected area. Further, during reproduction processing, the system control unit 50 executes specific processing such as image correction processing, trimming, and adding attribute information on the basis of the selected area.

FIG. 7 is a flowchart showing the area selection processing. FIG. 8 is a flowchart showing area selection processing performed using the left-right selection operation in detail. FIG. 9 is a flowchart showing area selection processing performed using the circulatory selection operation in detail. For example, these flowcharts and the processing therein are realized by the system control unit 50 by expanding the program stored in the nonvolatile memory 56 in the system memory 52 and executing the program. Note that the processing of FIG. 7 starts after transitioning to a state in which power is supplied to the digital camera 100, the user is looking through the eyepiece unit 16, and a live view image is displayed on the EVF 29.

In S701, the system control unit 50 determines whether or not automatic selection of a subject has been performed. Automatic selection is processing for automatically selecting a subject or a region (an organ) of the subject that satisfies a condition for selecting a main subject. For example, a specific type of subject detected substantially in the center of the EVF 29 or a region included in the subject is selected as the selection target. Whether or not to execute automatic selection can be set in advance by the user. When automatic selection has been executed, the processing advances to S702, and when automatic selection has not been executed, the processing advances to S703. In S702, the system control unit 50 displays a frame indicating the selected area on the selection target selected automatically in S701.

In S703, the system control unit 50 determines whether or not direct selection of a subject has been performed manually. Direct selection is processing in which the user directly specifies a specific type of subject or a region included in the subject as the selection target by performing a touch operation on the touch panel 70a, such as directly touching the position to be selected on the image displayed as the LV image. When direct selection has been executed, the processing advances to S704, and when direct selection has not been executed, the processing advances to S705. In S704, the system control unit 50 displays a frame indicating the selected area on the selection target selected directly in S703.

In S705, the system control unit 50 determines whether or not an area selection operation is possible. Whether or not a selection operation is possible can be determined by having the image processing unit 24 detect a plurality of subjects and organs (eyes, noses, mouths, and so on) within the areas of the subjects from a captured image, and determining whether or not the detected subjects and organs are in a state enabling selection thereof as an area. When a selection operation is possible, the user can select a subject or select an organ within the area of the subject on the image displayed on the EVF 29. When a selection operation is possible, the processing advances to S706, and when a selection operation is impossible, the processing advances to S710.

In S706, the system control unit 50 determines whether or not a direction selection operation has been executed. The direction selection operation includes the left and right selection operations described in FIGS. 6A to 6C, and also includes operations for selecting directions other than the left and right directions. Direction selection operations can be executed using the four-direction key 74, for example. When a direction selection operation has been executed, the processing advances to S707, and when a direction selection operation has not been executed, the processing advances to S708.

In S707, the system control unit 50 performs area selection on the basis of the direction selection operation. Area selection processing based on a direction selection operation will be described in detail below using FIG. 8.

In S708, the system control unit 50 determines whether or not the circulatory selection operation has been executed. The circulatory selection operation can be executed using the button allocated to the circulatory selection operation, for example the SET button 75. When the circulatory selection operation has been executed, the processing advances to S709, and when the circulatory selection operation has not been executed, the processing advances to S710.

In S709, the system control unit 50 performs area selection on the basis of the circulatory selection operation. Area selection processing based on the circulatory selection operation will be described in detail below using FIG. 9.

In S710, the system control unit 50 determines whether or not an operation to terminate area selection has been executed. When a termination operation has been executed, the area selection processing shown in FIG. 7 is terminated, and when a termination operation has not been executed, the processing returns to S701. When the area selection processing of FIG. 7 is applied to selection of an AF frame in the imaging mode, the system control unit 50 performs control so that AF is performed in the selected area selected in the processing of FIG. 7 in response to half-pressing of the shutter button 61. When the processing is applied to specification (determination) of a tracking subject, the system control unit 50 performs control so as to track the subject that exists in the selected area at the start point of tracking. When the processing is applied to selection of a light measurement area, the system control unit 50 performs control so that AE is performed on the basis of a photometric value in the selected area. The system control unit 50 performs control so that AF is performed in the selected area selected in the processing of FIG. 7 in response to half-pressing of the shutter button 61. Further, in response to fill-pressing of the shutter button 61, the system control unit 50 performs control so as to execute a series of imaging processing from image capture by the imaging unit 22 to recording of the captured image on the recording medium 200 in the form of an image file.

Using FIG. 8, the area selection processing based on a direction selection operation, described above in S707, will now be described in detail. Upon reception of a direction selection operation from the user, the system control unit 50 moves the selected area on the basis of the selected area that is currently selected and the gaze input position.

In S801, the system control unit 50 determines whether or not an operation to select the leftward direction has been executed. When an operation to select the leftward direction has been executed, the processing advances to S802, and when an operation to select the leftward direction has not been executed, the processing advances to S806.

In S802, the system control unit 50 determines whether or not the gaze input setting is ON (enabled) and gaze input has been detected. When gaze input has been detected, the processing advances to S803, and when the gaze input setting is OFF (disabled) or the gaze input setting is ON but a gaze has not been detected, the processing advances to S805.

In S803, the system control unit 50 determines whether or not a detectable subject such as a face is in the position of the detected gaze input. FIG. 8 illustrates a case in which the face of a person is detected. When a face is in the position of the detected gaze input, the processing advances to S804, and when a face is not in the position of the detected gaze input, the processing advances to S805.

In S804, when a face is in the gaze input position, the system control unit 50 selects the left eye of the face. In the selection process, a subject selected on the basis of the gaze input position and the direction of the direction selection operation is determined regardless of the location of the selected area (the position) that was selected prior to the direction selection operation received in S706. In the example of FIG. 6A, when the subject C is in the gaze input position 601 and the selected area 602 is the right eye of the subject A (display example 6-1-1), the system control unit 50 moves the selected area 602 to the left eye of the subject C in the gaze input position 601 (display example 6-1-2). Further, when the subject A is in the gaze input position 601 and the selected area 602 is the right eye of the subject A, as shown in FIG. 6B (display example 6-2-1), the system control unit 50 moves the selected area 602 to the left eye of the subject A (display example 6-2-2).

When the type of subject in the gaze input position is not the face of a person (i.e., an animal, a vehicle, or the like), the system control unit 50 may select an organ (for example, a tail or a leg of the animal, a window or a tire of the vehicle, and so on) on the left side within the subject. Note that when a specific subject is detected in the gaze input position but an organ included in the specific subject, such as an eye, a nose, or a mouth, is not detected, the system control unit 50 selects the entire subject (the entire face) in the position of the gaze input.

In S805, the system control unit 50 moves the selected area from the selected area currently selected (the selected area selected prior to the direction selection operation received in S706) to the subject or organ directly to the left thereof. This is the rule of the normal left-right direction selection operation described above. For example, when a face is selected, the system control unit 50 moves the selected area to the face directly to the left. When the right eye of the subject A is selected, as shown in FIG. 4 (display example 4-2), the system control unit 50 moves the selected area 401 to the left eye (display example 4-1). Further, when the left eye of the subject B is selected (display example 4-3), the system control unit 50 moves the selected area 401 to the right eye of the subject A directly to the left (display example 4-2).

In S806, the system control unit 50 determines whether or not an operation to select the rightward direction has been executed. When an operation to select the rightward direction has been executed, the processing advances to S807, and when an operation to select the rightward direction has not been executed, the processing advances to S811.

In S807, the system control unit 50 determines whether or not the gaze input setting is ON (enabled) and gaze input has been detected. When gaze input has been detected, the processing advances to S808, and when the gaze input setting is OFF (disabled) or the gaze input setting is ON but a gaze has not been detected, the processing advances to S810.

In S808, the system control unit 50 determines whether or not a detectable subject such as a face is in the position of the detected gaze input. When a face is in the position of the detected gaze input, the processing advances to S809, and when a face is not in the position of the detected gaze input, the processing advances to S810.

In S809, when a face is in the position of the gaze input, the system control unit 50 selects the right eye of the face. In the selection process, a subject selected on the basis of the position of the gaze input and the direction of the direction selection operation is determined regardless of the location of the selected area (the position) that was selected prior to the direction selection operation received in S706. In the example of FIG. 6A, when the subject C is in the gaze input position 601 and the selected area 602 is the right eye of the subject A (display example 6-1-1), the system control unit 50 moves the selected area 602 to the right eye of the subject C in the gaze input position 601 (display example 6-1-3). Further, in the example of FIG. 6B, when the subject A is in the gaze input position 601 and the selected area 602 is the right eye of the subject A (display example 6-2-1), the system control unit 50 moves the selected area 602 to the right eye of the subject A (display example 6-2-3).

When the subject in the gaze input position is not the face of a person, the system control unit 50 may select an organ on the right side within the subject. Note that when an organ such as an eye, a nose, or a mouth is not detected as a selection target, the system control unit 50 selects the entire subject (the entire face) in the position of the gaze input.

In S810, the system control unit 50 moves the selected area from the selected area currently selected (the selected area selected prior to the direction selection operation received in S706) to the subject or organ directly to the right thereof. This is the rule of the normal left-right direction selection operation described above. For example, when a face is selected, the system control unit 50 moves the selected area to the face directly to the right. When the left eye of the subject A is selected, as shown in FIG. 4 (display example 4-1), the system control unit 50 moves the selected area 401 to the right eye (display example 4-2). Further, when the right eye of the subject B is selected (display example 4-4), the system control unit 50 moves the selected area 401 to the left eye of the subject C directly to the right (display example 4-5).

In S811, the system control unit 50 determines whether or not an operation to select the downward direction has been executed. When an operation to select the downward direction has been executed, the processing advances to S812, and when an operation to select the downward direction has not been executed, the area selection processing shown in FIG. 8 is terminated.

In S812, the system control unit 50 determines whether or not the gaze input setting is ON (enabled) and gaze input has been detected. When gaze input has been detected, the processing advances to S813, and when the gaze input setting is OFF (disabled) or the gaze input setting is ON but a gaze has not been detected, the processing advances to S815.

In S813, the system control unit 50 determines whether or not a detectable subject such as a face is in the position of the detected gaze input. When a face is in the position of the detected gaze input, the processing advances to S814, and when a face is not in the position of the detected gaze input, the processing advances to S815.

In S814, when a face is in the position of the gaze input, the system control unit 50 selects the mouth of the face. In other words, in accordance with the user operation, the system control unit 50 sets an organ in a different position to (here, on the lower side of) the position selected prior to the user operation, among the organs included in the subject based on the position of the gaze input, as the selected area. In the selection process, a subject selected on the basis of the position of the gaze input and the direction of the direction selection operation is determined regardless of the location of the selected area that was selected prior to the direction selection operation received in S706. In other words, even when the selected area that is currently selected (the selected area selected prior to the direction selection operation received in S706) is a different subject to the subject in the gaze input position, the system control unit 50 moves the selected area to an organ of the subject in the gaze input position.

When the subject in the gaze input position is not the face of a person, the system control unit 50 may select an organ on the lower side within the subject. Note that when an organ such as an eye, a nose, or a mouth is not detected as a selection target, the system control unit 50 selects the entire subject (the entire face) in the position of the gaze input.

In S815, the system control unit 50 moves the selected area from the selected area currently selected (the selected area selected prior to the direction selection operation received in S706) to the subject or organ directly on the lower side thereof.

Area selection processing based on the circulatory selection operation as described in S709 will now be described in detail using FIG. 9. In S901, the system control unit 50 determines whether or not the gaze input setting is ON and gaze input has been detected. When gaze input has been detected, the processing advances to S902, and when the gaze input setting is OFF (disabled) or the gaze input setting is ON but a gaze has not been detected, the processing advances to S906.

In S902, the system control unit 50 determines whether or not a detectable subject such as a face is in the position of the detected gaze input. FIG. 9 illustrates a case in which the face of a person is detected. When a face is in the position of the detected gaze input, the processing advances to S903, and when a face is not in the position of the detected gaze input, the processing advances to S906.

In S903, the system control unit 50 determines whether or not the right eye of the subject in the gaze input position is selected as the current selected area (the selected area selected prior to the circulatory selection operation received in S708). When the right eye is selected, the processing advances to S904, and when the right eye is not selected, the processing advances to S905. A negative determination is also made when an organ of a different subject to the subject in the gaze input position is selected, and in this case, the processing advances to S905.

In S904, the system control unit 50 moves the selected area to the left eye of the subject in the gaze input position. In the example of FIG. 5A, when the subject C is in the gaze input position 501 and the selected area 502 is the right eye of the subject C (display example 5-1-2), the system control unit 50 moves the selected area 502 to the left eye of the subject C in the gaze input position 501 (display example 5-1-3).

In S905, the system control unit 50 moves the selected area to the right eye of the subject in the gaze input position. When the current selected area (the selected area selected prior to the circulatory selection operation received in S708) is not a region of the subject in the gaze input position, the system control unit 50 moves the selected area within the subject in the gaze input position in response to the circulatory selection operation, regardless of the position of the current selected area. In the example of FIG. 5A, when the subject C is in the gaze input position 501 and the selected area 502 is the left eye of the subject A (display example 5-1-1), the system control unit 50 moves the selected area 502 to the right eye of the subject C in the gaze input position 501 (display example 5-1-2).

In S906, the system control unit 50 moves the selected area to the subject or organ directly to the right of the selected area that is currently selected. This is the rule of the normal circulatory selection operation, described above using FIG. 4. For example, when the left eye of a certain face is currently selected, the right eye is selected, and when the right eye of a certain face is currently selected, the left eye of the face directly to the right is selected. Note that when an organ such as an eye, a nose, or a mouth is not detected as a selection target, the system control unit 50 can select a face.

According to this embodiment, as described above, by moving the selected area within the subject in the gaze input position when an area selection operation is executed by the user, an improvement in operability can be achieved in a case where the user selects a desired area. By moving the selected area (the selected position) to the subject in the gaze input position, the number of operation steps can be reduced. Further, the region of the subject in the gaze input position to which the selected area is to be moved is determined not only by the gaze position but also by the operation performed on the operating unit. The gaze input position is not suitable for precise position specification due to a human characteristic (fixational tremor) according to which the detected gaze position does nest remain constant even when the user looks continuously at the same position, and so on. In this embodiment, however, rough position determination is implemented by determining the subject serving as the movement destination of the selected area on the basis of the gaze input position, and precise position determination for selecting a region within the subject is implemented by performing an operation on the operating unit. As a result, the region intended by the user can be selected accurately with a small number of operation steps.

Note that the various types of control described above as being executed by the system control unit 50 may be executed by a single piece of hardware, or overall control of the device may be performed by apportioning the processing to a plurality of pieces of hardware (a plurality of processors and circuits, for example).

Further, the present invention was described in detail above on the basis of preferred embodiments, but the present invention is not limited to these specific embodiments and includes various embodiments within a scope that does not depart from the spirit of the invention. Furthermore, the above embodiments merely illustrate one aspect of the present invention, and the embodiments may be combined as appropriate.

Moreover, in the above embodiments, a case in which the present invention is applied to the digital camera (an imaging device) was described as an example, but the present invention is not limited to this example and may be applied to any electronic device capable of receiving gaze input. For example, the present invention can also be applied to a personal computer or a PDA, a mobile telephone terminal or a portable image viewer, a printer apparatus, a digital photo frame, a music player, a game machine, an electronic book reader, a video player, and so on. The present invention can also be applied to a wearable device such as a head-mounted display (HMD), a display device (including a projection device), a tablet terminal, a smartphone, an AI speaker, a household appliance, an in-vehicle device, a medical instrument, and so on.

According to the present invention, an improvement in operability can be achieved when a user selects a desired area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-213504, filed on Nov. 26, 2019, which is hereby incorporated by reference herein in its entirety.

What is claimed is:

1. An electronic device comprising: at least one memory and at least one processor which function as:
   a gaze detecting unit configured to detect a position of gaze input on an image displayed on a display unit;
   a subject detecting unit configured to detect from the image a subject of a specific type and a region included in the subject of the specific type; and
   a control unit configured to execute control so that,
      in a case where a position selected prior to a user operation on an operating member is not on the subject in the position of gaze input, a region corresponding to the user operation, which is included in the subject in the position of gaze input, is selected in response to the user operation, regardless of the position selected prior to the user operation, and
      in a case where a subject is not detected by the subject detecting unit in the position of gaze input, a position, which is based on the user operation and the selected position selected prior to the user operation, is selected rather than the position of gaze input.

2. The electronic device according to claim 1, wherein the subject of the specific type is a face of a person and the region is an organ of the face.

3. The electronic device according to claim 2, wherein the organ includes a right eye and a left eye.

4. The electronic device according to claim 1, wherein the control unit executes control so that in a case where the user operation is an operation for specifying a first direction, a region on the first direction side within the subject in the position of gaze input is selected, and in a case where the user operation is an operation for specifying a second direction, a region on the second direction side within the subject in the position of gaze input is selected.

5. The electronic device according to claim 1, wherein
   the subject of the specific type is a face and the region is an eye, and
   the control unit executes control so that in a case where the user operation is an operation for specifying a first direction, an eye on the first direction side on the face in the position of gaze input is selected, and in a case where the user operation is an operation for specifying a second direction, an eye on the second direction side on the face in the position of gaze input is selected.

6. The electronic device according to claim 1, wherein the control unit executes control so that in a case where a specific subject is detected by the subject detecting unit in the position of gaze input but a region included in the specific subject is not detected, the entirety of the specific subject is selected in response to the user operation.

7. The electronic device according to claim 1, wherein the control unit executes control so that in a case where the position selected prior to the user operation is on the subject in the position of gaze input, a region different from the position selected prior to the user operation, among regions included in the subject in the position of gaze input, is selected in response to the user operation.

8. The electronic device according to claim 1, wherein the control unit executes control to ensure that in a case where the position selected prior to the user operation is on the subject in the position of gaze input, a region included in a subject different from the subject in the position of gaze input is not selected in response to the user operation.

9. The electronic device according to claim 1, wherein the control unit executes control so that when setting has been performed to disable processing based on the gaze input, a position, which is based on the user operation and the selected position selected prior to the user operation, is selected.

10. The electronic device according to claim 1, wherein the control unit executes control so that specific processing is executed on the basis of a region selected in response to the user operation.

11. The electronic device according to claim 10, wherein
    the image displayed on the display unit is a live view image captured by an imaging unit, and
    the specific processing is at least one of autofocus, automatic exposure, and tracking subject determination.

12. The electronic device according to claim 10, wherein the image displayed on the display unit is a reproduced image.

13. The electronic device according to claim 12, wherein the specific processing is at least one of image correction processing, trimming, and adding attribute information.

14. A control method for an electronic device, the method comprising:
    a gaze detection step for detecting a position of gaze input on an image displayed on a display unit;
    a subject detection step for detecting from the image a subject of a specific type and a region included in the subject of the specific type;
    selecting one of a first control operation and a second control operation in accordance with whether or not a subject is detected in a position of gaze input and whether or not a position selected prior to a user operation on an operating member is on the subject in the position of gaze input; and
    a control step for executing a selected one of the first control operation and the second control operation,
       wherein in the first control operation, a region corresponding to the user operation, which is included in the subject in the position of gaze input, is selected in response to the user operation, regardless of the position selected prior to the user operation, in accordance with a determination that a position selected prior to the user operation on the operating member is not on the subject in the position of gaze input, and
       wherein in the second control operation, a position, which is based on the user operation and the selected position selected prior to the user operation, is selected rather than the position of gaze input in accordance with a determination that a subject is not detected in the position of gaze input in the subject detection step.

15. A non-transitory computer readable medium that stores a program, wherein the program causes a computer to execute:
    a gaze detection step for detecting a position of gaze input on an image displayed on a display unit;
    a subject detection step for detecting from the image a subject of a specific type and a region included in the subject of the specific type; and
    a control step for executing control so that
       in a case where a position selected prior to a user operation on an operating member is not on the subject in the position of gaze input, a region corresponding to the user operation, which is included in the subject in the position of gaze input, is selected in response to the user operation, regardless of the position selected prior to the user operation, and in a case where a subject is not detected in the position of gaze input in the subject detection step, a position, which is based on the user operation and the selected position selected prior to the user operation, is selected rather than the position of gaze input.

\* \* \* \* \*